US012260661B2

(12) United States Patent
Goto et al.

(10) Patent No.: US 12,260,661 B2
(45) Date of Patent: Mar. 25, 2025

(54) TOPIC CLASSIFIER WITH SENTIMENT ANALYSIS

(71) Applicant: International Business Machines Corporation, Armonk, NY (US)

(72) Inventors: Takuya Goto, Kodaira (JP); Yoshiroh Kamiyama, Setagaya-ku (JP)

(73) Assignee: International Business Machines Corporation, Armonk, NY (US)

(*) Notice: Subject to any disclaimer, the term of this patent is extended or adjusted under 35 U.S.C. 154(b) by 558 days.

(21) Appl. No.: 17/656,467

(22) Filed: Mar. 25, 2022

(65) Prior Publication Data

US 2023/0306770 A1 Sep. 28, 2023

(51) Int. Cl.
*G06K 9/00* (2022.01)
*G06N 20/00* (2019.01)
*G06V 30/19* (2022.01)
*G06V 30/41* (2022.01)

(52) U.S. Cl.
CPC ............. *G06V 30/41* (2022.01); *G06N 20/00* (2019.01); *G06V 30/1912* (2022.01); *G06V 30/1916* (2022.01)

(58) Field of Classification Search
CPC ............... G06V 30/41; G06V 30/1916; G06V 30/1912; G06N 20/00
See application file for complete search history.

(56) References Cited

U.S. PATENT DOCUMENTS

| 8,041,669 | B2  |   | 10/2011 | Nigam et al. |
|-----------|-----|---|---------|--------------|
| 9,020,956 | B1  | * | 4/2015  | Barr ....................... G06F 16/951 |
|           |     |   |         | 707/750 |
| 9,672,475 | B2  | * | 6/2017  | Clark ...................... G06N 20/00 |
| 10,977,667| B1  | * | 4/2021  | L'Huillier ........... G06F 16/3344 |
| 11,055,119| B1  | * | 7/2021  | Silverstein ............... G06N 3/08 |
| 11,062,094| B2  | * | 7/2021  | Kieser ..................... G06F 17/18 |
| 11,068,666| B2  |   | 7/2021  | Sengupta et al. |

(Continued)

FOREIGN PATENT DOCUMENTS

| CN | 112434164 A | 3/2021 |
| CN | 112527963 A | 3/2021 |

(Continued)

OTHER PUBLICATIONS

Tripathy, Abinash, Abhishek Anand, and Santanu Kumar Rath. "Document-level sentiment classification using hybrid machine learning approach." Knowledge and Information Systems 53 (2017): 805-831. (Year: 2017).*

(Continued)

*Primary Examiner* — Avinash Yentrapati
(74) *Attorney, Agent, or Firm* — Kelsey M. Skodje (57) ABSTRACT

A method, system, and computer program product are disclosed. The method includes receiving a set of documents, selecting a topic, and determining that a first document from the set contains a topic label for the topic. The method also includes generating a topic sentiment score for the first document and adding the topic sentiment score to a set of training data. Additionally, the method includes determining that a second document from the set does not contain (Continued)

the topic label, generating an average sentiment score for the second document, and generating a bias factor for the average sentiment score.

20 Claims, 5 Drawing Sheets

(56) References Cited

U.S. PATENT DOCUMENTS

| | | | | |
|---|---|---|---|---|
| 2009/0319342 | A1* | 12/2009 | Shilman | G06Q 30/02 |
| | | | | 705/7.41 |
| 2011/0093417 | A1* | 4/2011 | Nigam | G06F 40/253 |
| | | | | 706/47 |
| 2015/0074020 | A1* | 3/2015 | Arpat | G06Q 10/10 |
| | | | | 706/12 |
| 2015/0248424 | A1* | 9/2015 | Berube | G06F 16/93 |
| | | | | 715/234 |
| 2016/0171386 | A1 | 6/2016 | Brun et al. | |
| 2016/0314191 | A1 | 10/2016 | Markman et al. | |
| 2018/0165554 | A1* | 6/2018 | Zhang | G06N 3/045 |
| 2018/0218335 | A1* | 8/2018 | Jenkins | H04L 67/535 |
| 2019/0036835 | A1* | 1/2019 | Chakra | H04L 41/40 |
| 2019/0057310 | A1* | 2/2019 | Olmstead | G06N 5/02 |
| 2019/0108493 | A1* | 4/2019 | Nelson | G06Q 10/1095 |
| 2020/0004816 | A1* | 1/2020 | Kieser | G06F 40/30 |
| 2020/0019611 | A1* | 1/2020 | Tutubalina | G06F 40/30 |
| 2020/0403817 | A1* | 12/2020 | Daredia | G06F 16/483 |
| 2021/0109994 | A1* | 4/2021 | Sengupta | G06N 5/04 |
| 2021/0264480 | A1* | 8/2021 | Silverstein | H04L 67/02 |
| 2022/0036010 | A1* | 2/2022 | Sengupta | G06N 7/01 |

FOREIGN PATENT DOCUMENTS

| | | |
|---|---|---|
| JP | 5283288 B2 | 9/2013 |
| JP | 2016530651 A | 6/2016 |

OTHER PUBLICATIONS

O'Hare, Neil, et al. "Topic-dependent sentiment analysis of financial blogs." Proceedings of the 1st international CIKM workshop on Topic-sentiment analysis for mass opinion. 2009. (Year: 2009).*

Lin et al., "Joint sentiment/topic model for sentiment analysis," https://dl.acm.org/doi/10.1145/1645953.1646003, CIKM 09: Proceedings of the 18th ACM Conference on Information and Knowledge Management, Nov. 2009, pp. 375-384 (abstract).

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

TOPIC CLASSIFIER WITH SENTIMENT ANALYSIS

BACKGROUND

The present disclosure relates to document classification and, more specifically, to analyzing topic and sentiment correlation.

Topic modeling is a technology of statistical latent semantic analysis that categorizes documents by grouping them based on their co-occurrence of latent semantic concepts ("topics"). Topic modeling is an unsupervised machine learning technology, while topic classifications is a supervised machine learning technology. Sentiment analysis is a natural language processing and text analysis task that seeks to identify, extract, and quantify subjective information about a topic.

SUMMARY

Various embodiments are directed to a method that includes receiving a set of documents, selecting a topic, and determining that a first document from the set contains a topic label for the topic. The method also includes generating a topic sentiment score for the first document and adding the topic sentiment score to a set of training data. Additionally, the method includes determining that a second document from the set does not contain the topic label, generating an average sentiment score for the second document, and generating a bias factor for the average sentiment score Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Aspects of the present disclosure relate generally to a method for modeling a relationship between topics and sentiment polarity. While the present disclosure is not necessarily limited to such applications, various aspects of the disclosure may be appreciated through a discussion of various examples using this context.

Often analysts want to know the correlation between a topic in a document and an associated sentiment or opinion (e.g., whether a customer liked or disliked a product sold to them). Machine learning techniques can be used to classify topics, but require large sets of training data to build accurate models. For example topic classification can require a user to manually annotate documents with topic labels in order to train a model to produce accurate results. This can be a lengthy and expensive process, e.g., when there are hundreds of documents to label. Documents may also have missing or unclear information that leads to inaccurate labeling/model training.

Sentiment analysis commonly uses models that rely on topic classification in order to determine sentiments associated with target topics and can therefore be significantly limited by inaccurate, missing, or unclear topic labels. Additionally, simply combining topic classification and sentiment analysis can result in a number of issues that may cause inaccuracy.

For example, a document may contain multiple topics with different sentiments, which can result in the sentiment analysis not equaling the sentiment of the topic. As an example, the sentence "I liked the hamburger, but I didn't like the hotdog," with a classified topic "hamburger" may produce a neutral sentiment rather than a positive one because there is a positive sentiment marker and a negative sentiment marker. Similarly, the sentence "I loved the hotel, except for the lunch special," with a classified topic "lunch special" may produce a positive sentiment rather than a negative one. Another challenging example occurs in a sentence like "The hamburger was so much better than the hotdog," where there are multiple topics and difficult to discern sentiments Another problem can occur when a topic's label is not found in a document. During topic classification, target tokens or labels may need to be specified for sentiment analysis. However, there are many different words that can represent the same idea. Annotating a document to include every word imaginable to represent an idea can be impractical. As a result, labels of the topic are not always included in documents. As an example, the sentence "Today's special was good." with a classified topic of "lunch special" may produce a neutral sentiment rather than a positive one because "lunch special" is missing in the sentence. Overcoming this challenge may allow sentiment analysis even though a topic label is not found or is unclear.

Topic classification can use statistical latent semantic analysis to categorize documents. Topic classification groups documents based on their co-occurrence of latent semantic concepts or "topics". Topic classification allows a user to understand the subject of a document or group of documents without having to read the entire document. A topic classifier identifies words or phrases within the document or documents so to group them by said topics.

Sentiment analysis can utilize natural language processing. Document sentiment analysis typically estimates a sentiment tag using natural language processing techniques for an entire document and/or for each sentence in a document regardless of the topics or subjects within the document. Target sentiment analysis generally has the goal of estimating a sentiment of a topic and applying a tag to represent the estimation so a user can understand the opinion towards the topic. For example, a customer may write a review indicating that they enjoyed a burger at a restaurant, and the goal of sentiment analysis would be to tag this review as positive as it relates to the restaurant's burger. Target sentiment analysis estimates a sentiment tag for a particular subject. In some situations, the topic or "target" is preselected by a user as the topic to be analyzed. Target sentiment analysis can specifically analyze the sentiments towards a specific subject or topic, rather than all the topics in a document. For example, the review example above can continue to discuss the side dishes with the hamburger, but the sentiment analysis can be focused on the topic hamburger. However, as noted above, when the side dish has a different sentiment than the hamburger, this can lead to a less accurate model.

Disclosed herein are techniques for modeling relationships between topics and sentiment polarity in a document. The techniques may overcome challenges discussed above by calculating a sentiment score even when a topic label is not found or is unclear. In some embodiments, a sentiment score is generated for a document without a topic label by finding average sentiment scores of sentences within the document. Depending on the bias and/or level of bias toward one sentiment, the document can be tagged with the score or a user may be asked to confirm an estimated score before tagging. Additionally, the lengthiness/expense of the annotating process may be further reduced in embodiments where the estimated sentiment tag need not be selected at all. The disclosed techniques may also include incorporating previously obtained results and data as training data that is retained to update a machine learning model for finding a relationship between topic and sentiment polarity in a document.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
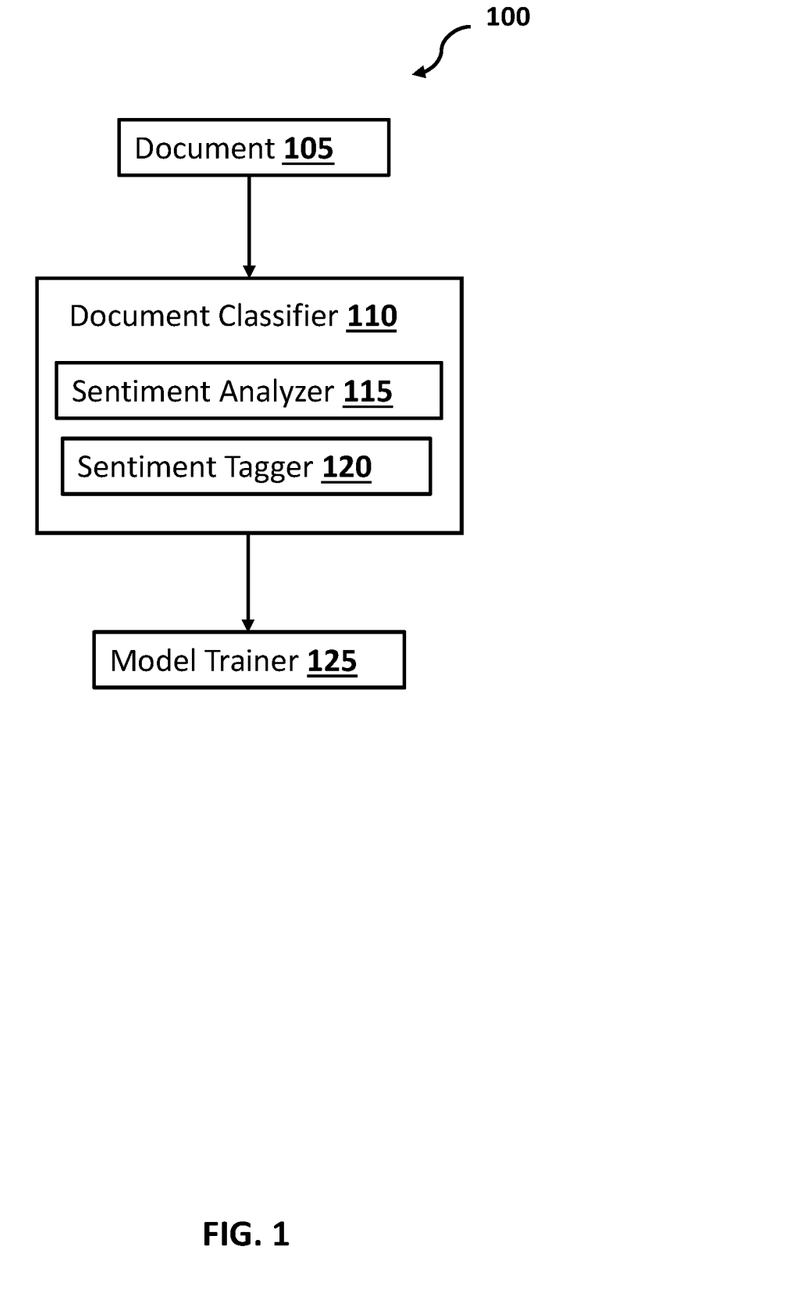
FIG. 1 is a block diagram illustrating a document classifier environment, according to some embodiments of the present disclosure.

Turning now to the figures, FIG. 1 is a block diagram illustrating a document classifier environment 100, according to some embodiments of the present disclosure. Environment 100 can include the following subcomponents and/or modules, document 105, document classifier 110, sentiment analyzer 115, sentiment tagger 120, and a model trainer 115.

Document 105 can be any machine-readable source of text (e.g., natural language text). As an example, the document 105 can include one or more customer reviews, news articles, entertainment reviews, research papers/results, books, etc. In some embodiments, there can be multiple documents (e.g., two different files) and/or formats. The text can be plain text or formatted text. In some embodiments, portions of document 105 can be structured, semi-structured, and/or unstructured. While one document 105 is illustrated herein, there can be any appropriate number of documents (e.g., for training a topic classifying and/or sentiment analyzing model) in addition to document 105.

Document classifier 110 can process document 105 and can classify its contents by topics and/or sentiments. The document classifier 110 can take document 105 and produce a sentiment score for a labeled topic in the document or a score based on sentiments in the document when there is no topic label. Training documents with scores such as these can be used to build/optimize machine learning models for finding correlations between given topics and sentiments/sentiment polarities. The document classifier 110 may also facilitate an annotating process by producing estimated sentiment tags in documents with no topic label and/or less clear sentiment scores, which may optionally be selected by an annotator.

The sentiment analyzer 115 can calculate a sentiment score for each document 105 that is received by the document classifier 110. The sentiment analysis looks to the document to determine if the sentiments found within are so heavily biased towards one sentiment that it is clear the document is meant to be classified for that heavily biased sentiment. The sentiment analyzer 115 can be configured to calculate a bias factor that reflects relative quantities of sentiments found in the document. The sentiment analyzer 115 may be configured to calculate a bias factor depending on some midpoint of sentiments found in the document. The sentiment analyzer 115 may also be configured to calculate a bias factor depending on some high or low setpoint of sentiments found in a document.

In one embodiment, the sentiment analysis may calculate a heavy bias factor for a document that contains a sentiment accounting for over 90% of the total sentiments in the document (e.g., the document contains 90% positive sentiments and only 10% negative sentiments). In another embodiment, the sentiment analysis may calculate a moderate bias factor for a document that contains a sentiment accounting for a 60% of the total sentiments in the document (e.g., the document contains 60% positive sentiments and 40% negative sentiments). In another embodiment, the sentiment analysis may update the relative amounts/thresholds of sentiments found in a document that result in a heavy bias factor or moderate bias factor based on previously generated bias factors, user input, sentiment scores, etc.

The sentiment tagger 120 can generate an estimated sentiment tag for the document 105 when it does not have a clear topic label or a highly biased sentiment. The sentiment tagger 120 can work with the sentiment analyzer 115 to determine the quantities of each sentiment found in document 105 (e.g., sentiment scores for sentences in the document) and produce an estimated sentiment tag, which may be output to the user for selection. As an example, the sentiment analyzer 115 may determine that document 105 has no topic label and has 50% positive sentiments and 50% negative sentiments, and the sentiment tagger 120 may produce an option representing these values for the user to select. The user may also select an option for "unknown" or skip the selection in some embodiments. In further embodiments, there may be an option for automatic selection of an estimated tag based, e.g., on a threshold sentiment value. In some embodiments, the threshold can be user-adjustable. For example, there may be a threshold of 60%, wherein a sentiment tag estimated with at least 60% confidence can be automatically selected.

The model trainer 125 can build and optimize a machine learning model for correlating topics and sentiments in documents. The model trainer 125 can use training data including tagged documents with previously generated sentiment scores from the sentiment analyzer 115, user feedback to the sentiment tagger 120 (e.g., feedback confirming or dismissing an estimated/suggested sentiment score), and an average of sentiment scores across all documents. The model trainer 125 can use a set of validation data to continuously fine-tune and optimize its model (see below).

In some embodiments, the model trainer 125 uses a general linear or non-linear classifier for its machine learning process. As an example, the model trainer 125 may use machine learning processes such as support vector machines and logistic regressions. To further exemplify this, the model trainer 125 may use neural networks such as multi-layer perceptrons, recurrent neural networks, and convolutional neural networks.

Figure 2:
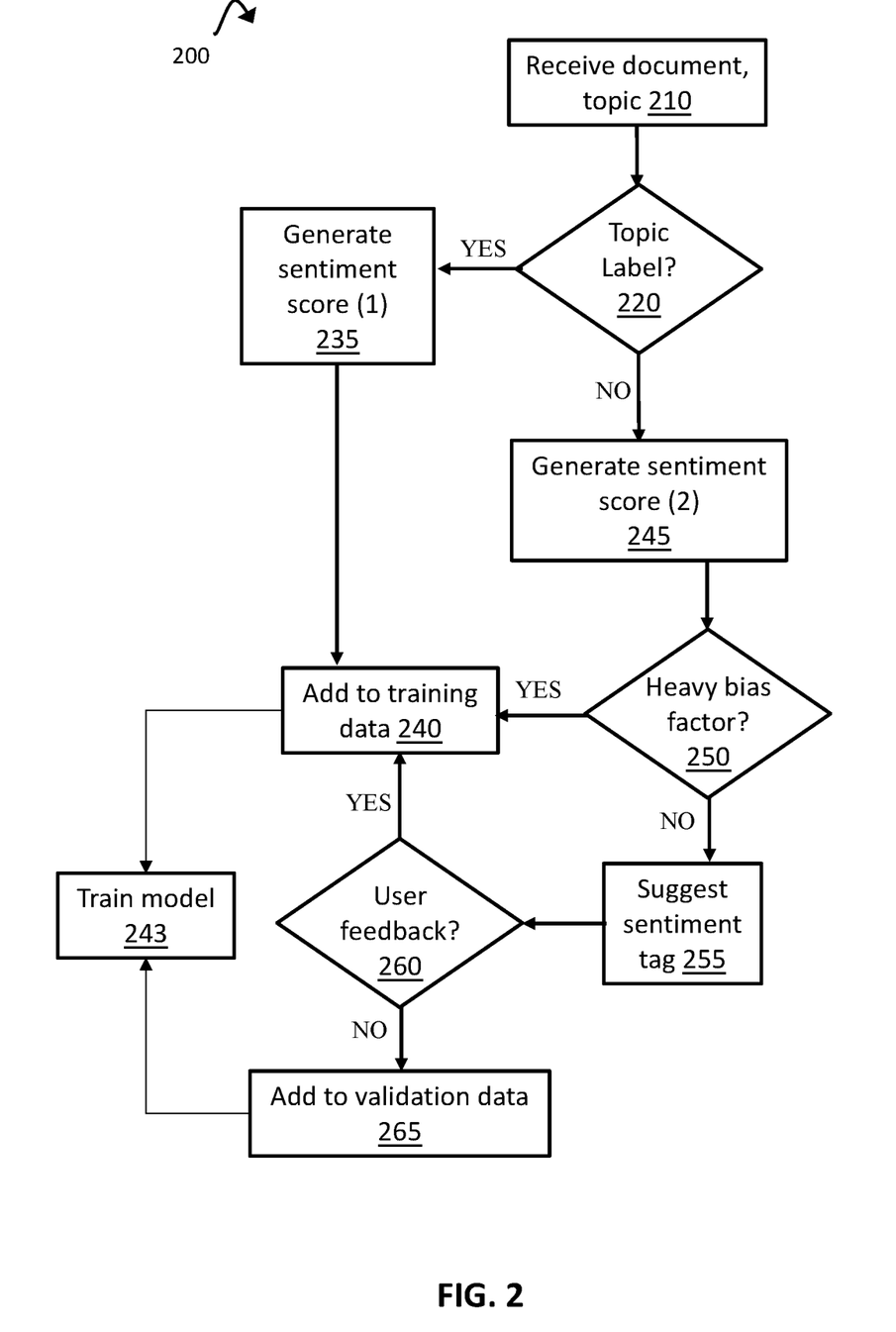
FIG. 2 is a flow diagram illustrating a process of document classification, according to some embodiments of the present disclosure.

FIG. 2 is a flow diagram illustrating a process 200 of modeling a relationship between topic and sentiment polarity, according to some embodiments of the present disclosure. To illustrate process 200, but not to limit embodiments, FIG. 2 is described within the context of the document classifier with sentiment environment 100 illustrated in FIG. 1.

At operation 210, documents (e.g., document 105) and topic labels for classification can be received. For example, the document(s) can be received with a label $l_i$ representing a topic $t_i$. In some embodiments, there can be topics $\{t_i \epsilon T\}$ corresponding to labels $\{l_i \epsilon L\}$. At operation 220, document classifier 110 can check a first document for the presence of topic labels for a given topic. In some embodiments topic labels may have been pre-annotated by the user or generated automatically (e.g., using topic modeling). However, topic labels can be identified using any conventional techniques.

If a topic label is found, then document classifier 110 can proceed to operation 235 where a topic sentiment score can be found using a first method (1) based on a sentiment analysis of the target topic. For example, where a topic label $l_i$ is found for topic $t_i$ in document 105, a sentiment score $s_{i,j}$ can be calculated to reflect the sentiment associated with the topic. At operation 235, the sentiment score may be calculated using the following equation:

$$s_{i,j} = \begin{cases} (1, 0) \text{ (target sentiment of } l_i \text{ is positive)} \\ (0.5, 0.5) \text{ (target sentiment of } l_i \text{ is neutral)} \\ (0, 1) \text{ (target sentiment of } l_i \text{ is negative)} \end{cases} \quad (1)$$

The document can be given a sentiment tag corresponding to the topic. The resulting tagged document $d_{i,j}$ can then be added to a set of training data $D^T$. This is illustrated at operation 240. Data generated at operation 240 can be used to train a topic/sentiment model at operation 243, which is discussed in greater detail below.

However, if no topic label is found at operation 220, then document classifier 110 can proceed to operation 245 where a sentiment score based on the overall document can be calculated (equation 2). Various natural language processing/sentiment analysis techniques known in the art can be used to identify/score document portions (e.g., sentences, phrases, etc.) containing positive, negative, or neutral sentiments in the document. Scores for these portions (herein, "sentences") can be combined to find the overall sentiment score for the document. This score can include averages of the positive and negative scores for each sentence. For example, at operation 245 the sentiment score $s_{i,j}$ may be calculated for using the following equation:

$$s_{i,j} = \left( \frac{\Sigma_h p_{i,j}^h}{\Sigma_h p_{i,j}^h + \Sigma_h n_{i,j}^h}, \frac{\Sigma_h n_{i,j}^h}{\Sigma_h p_{i,j}^h + \Sigma_h n_{i,j}^h} \right) = (\bar{p}_{i,j}, \bar{n}_{i,j}) \quad (2)$$

where $p_{i,j}^h$ represents a positive sentiment score for sentence $x_h$ and $n_{i,j}^h$ represents a negative sentiment score for sentence $x_h$.

It can then be determined whether the sentiment score determined at operation 245 has a heavy bias factor. This is illustrated at operation 250. When the score is represented by $s_{i,j} = (\bar{p}_{i,j}, \bar{n}_{i,j})$, a bias factor can be determined based on the magnitude of difference between the positive and negative scores. For example, when $|\bar{p}_{i,j} - \bar{n}_{i,j}| < S^{th}$, where $S^{th}$ is a threshold value, it can be determined that the document does not have a heavy bias factor. When there is a heavy bias factor found at operation 250, such as when $|\bar{p}_{i,j} - \bar{n}_{i,j}| > S^{th}$, process 200 can proceed to operation 240 and update the training data set $D^T$ to include $d_{i,j}$ where $s_{i,j}$ is found using equation 2 (operation 245) rather than equation 1 (operation 235).

However, if no heavy bias factor is found at operation 250, such as when $|\bar{p}_{i,j} - \bar{n}_{i,j}| < S^{th}$, a suggested sentiment tag based on the sentiment score (2) found at operation 245 can be generated. This is illustrated at operation 255. For example, the suggested tag can be provided to a user/annotator as a "weak annotation". In some embodiments, the positive and/or negative scores found in equation 2 can be shown to an annotator. The annotator may also receive a confidence value, a magnitude of difference between $\bar{p}_{i,j}$ and $\bar{n}_{i,j}$, or other indicator of which sentiment is more likely (e.g., percent positive or negative sentiments in document).

It can then be determined whether user feedback has been provided in response to the suggested sentiment tag. This is illustrated at operation 260. For example, the user can confirm whether or not a weak annotation (e.g., indicating positive or negative sentiment) is correct. The user may also select sentiment score options such as positive, negative, or neutral for the topic (e.g., topic $t_i$). If user feedback is provided at operation 260, the sentiment score indicated by the feedback is used in and added to training set $D^T$ at operation 240. In other embodiments, operation 260 may be omitted.

If no user feedback is received at operation 260 (or if operation 260 is omitted), the sentiment score (2) generated at operation 245 can be included in and added to a set of validation data $D^V$. This is illustrated at operation 265. Process 200 can then continue to operation 243, wherein the validation data $D^V$ can be used to fine-tune the topic/sentiment model. As discussed above, the model can be trained on training data $D^T$ from operation 240. At operation 243, an output y from the $D^T$ or validation data set $D^V$ can be expressed by $y_{i,j} \leftarrow (cls_i, s_{i,j})$, where $s_{i,j}$ is a sentiment score and $cls_i$ is a one-hot vector indicating a class of topic $t_i$.

With this output $y_{i,j}$, the model $f(d_{i,j})$ can be trained on training set $D^T$ using the following equation:

$$\underset{f}{\text{argmin}} \mathcal{L}(y_{i,j}, \hat{y}_{i,j}) \quad (3)$$

where $\hat{y}_{i,j} = f(d_l) = (\widehat{cls}_{i,j}, \hat{s}_{i,j})$ and where $\mathcal{L}(y_{i,j}, \hat{y}_{i,j})$ is a loss function of $y_{i,j}$ and $\hat{y}_{i,j}$. In some embodiments, fine-tuning can be applied to the model using equation 3 and validation data set $D^V$.

While not illustrated in FIG. 2, process 200 can include more than one loop beginning after operation 240 or 265 (e.g., for document j+1 and/or topic i+1) in order to obtain training and/or validation data for multiple documents and/or topics (e.g., for each loop of a document $d_i \epsilon D$), as will be understood by persons of ordinary skill in the art.

The model generated at operation 243 can be used to classify new documents. For example, each loop of a new document ($d_k \in \overline{D}$) can result in $\hat{y}_{i,j}=f(d_k)$. A sentiment tag $st_k$ for the new document can then be obtained using the following equation:

$$st_k = \begin{cases} \text{positive } (p_k - n_k > th) \\ \text{neutral } (|p_k - n_k| \le th) \\ \text{negative } (p_k - n_k < -th) \end{cases} \quad (4)$$

where $\hat{s}_k = (p_k, n_k)$ and th can represent at least one threshold value. The model can be updated with new training/validation data using techniques illustrated in FIG. 2.

Figure 3:
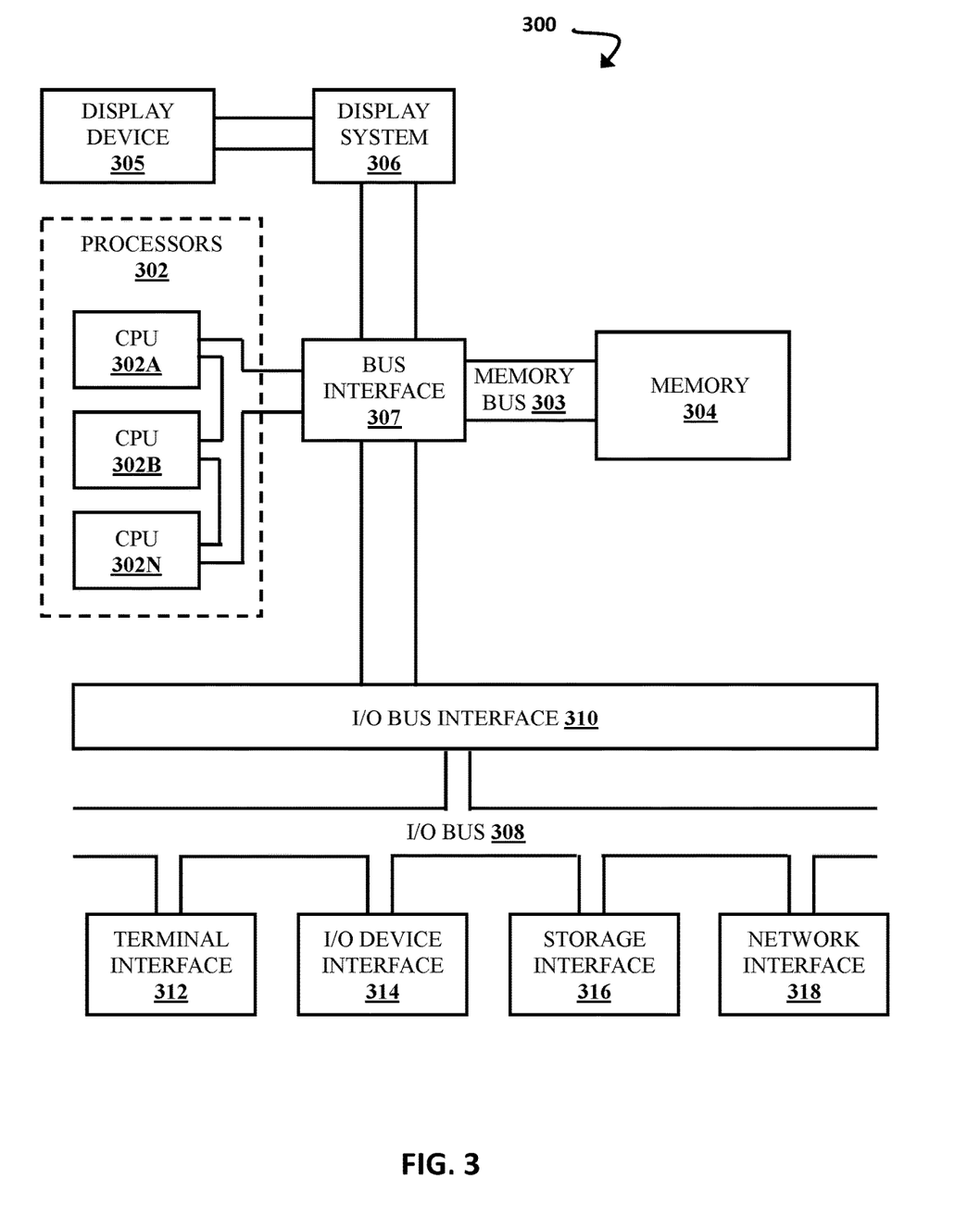
FIG. 3 is a block diagram illustrating a computer system, according to some embodiments of the present disclosure.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302A, 302B, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 304 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300 and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

The document classifier 110, sentiment analyzer 115, sentiment tagger 120, and model trainer 125 (FIG. 1), are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, components of the memory 304 are not necessarily all completely contained in the same storage device at the same time. Further, although these components are illustrated as being separate entities, in other embodiments some of these components, portions of some of these components, or all of these components may be packaged together.

In an embodiment, components of environment 100 include instructions that execute on the processor 302 or instructions that are interpreted by instructions that execute on the processor 302 to carry out the functions as further described in this disclosure. In another embodiment, the components of environment 100 are implemented in hardware via semiconductor devices, chips, logical gates, circuits, circuit cards, and/or other physical hardware devices in lieu of, or in addition to, a processor-based system. In another embodiment, the components of environment 100 include data in addition to instructions.

Although the memory bus 303 is shown in FIG. 3 as a single bus structure providing a direct communication path among the CPUs 302, the memory subsystem 304, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
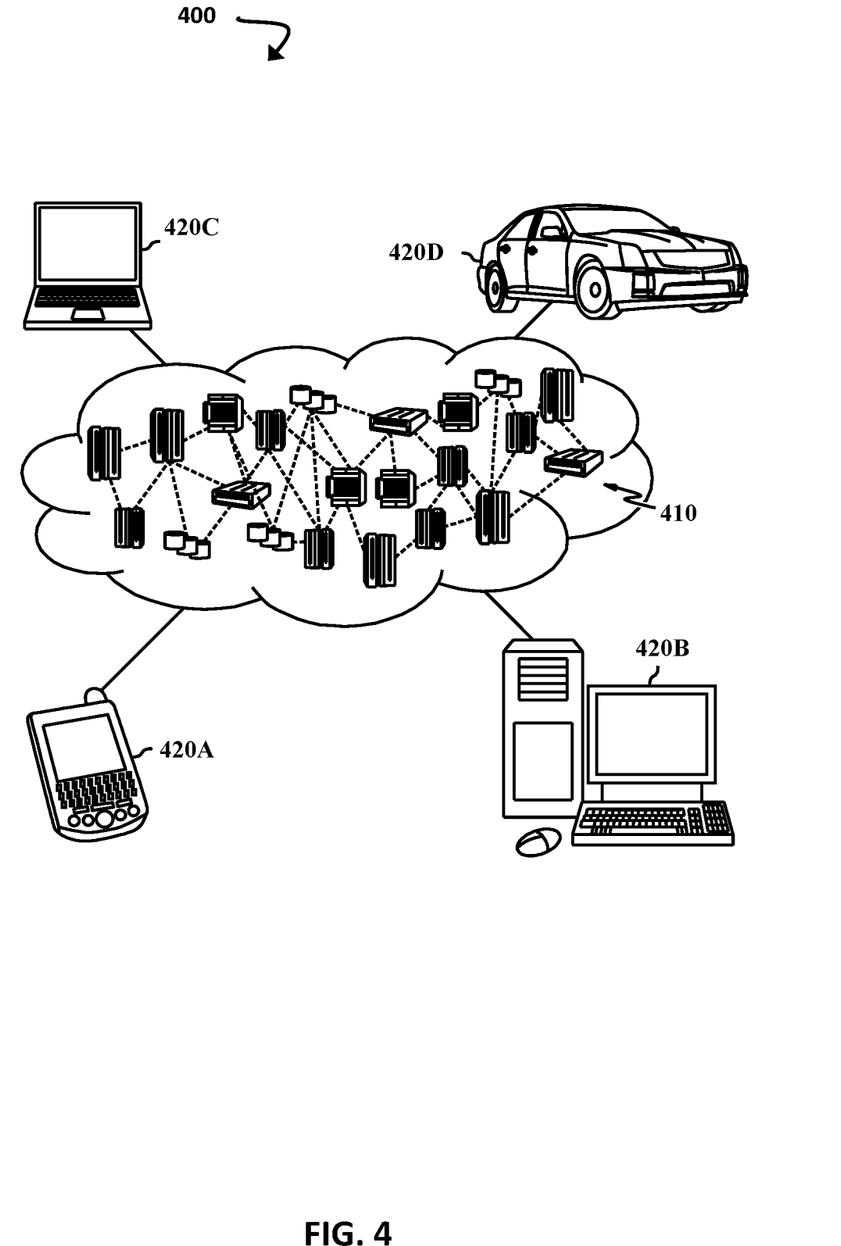
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420A, desktop computer 420B, laptop computer 420C, and/or automobile computer system 420D may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420A—420D shown in FIG. 4 are intended to be illustrative only and that computing nodes 410 and cloud computing environment 400 can communicate with any type of computerized device over any type of network and/or network addressable connection (e.g., using a web browser).

Figure 5:
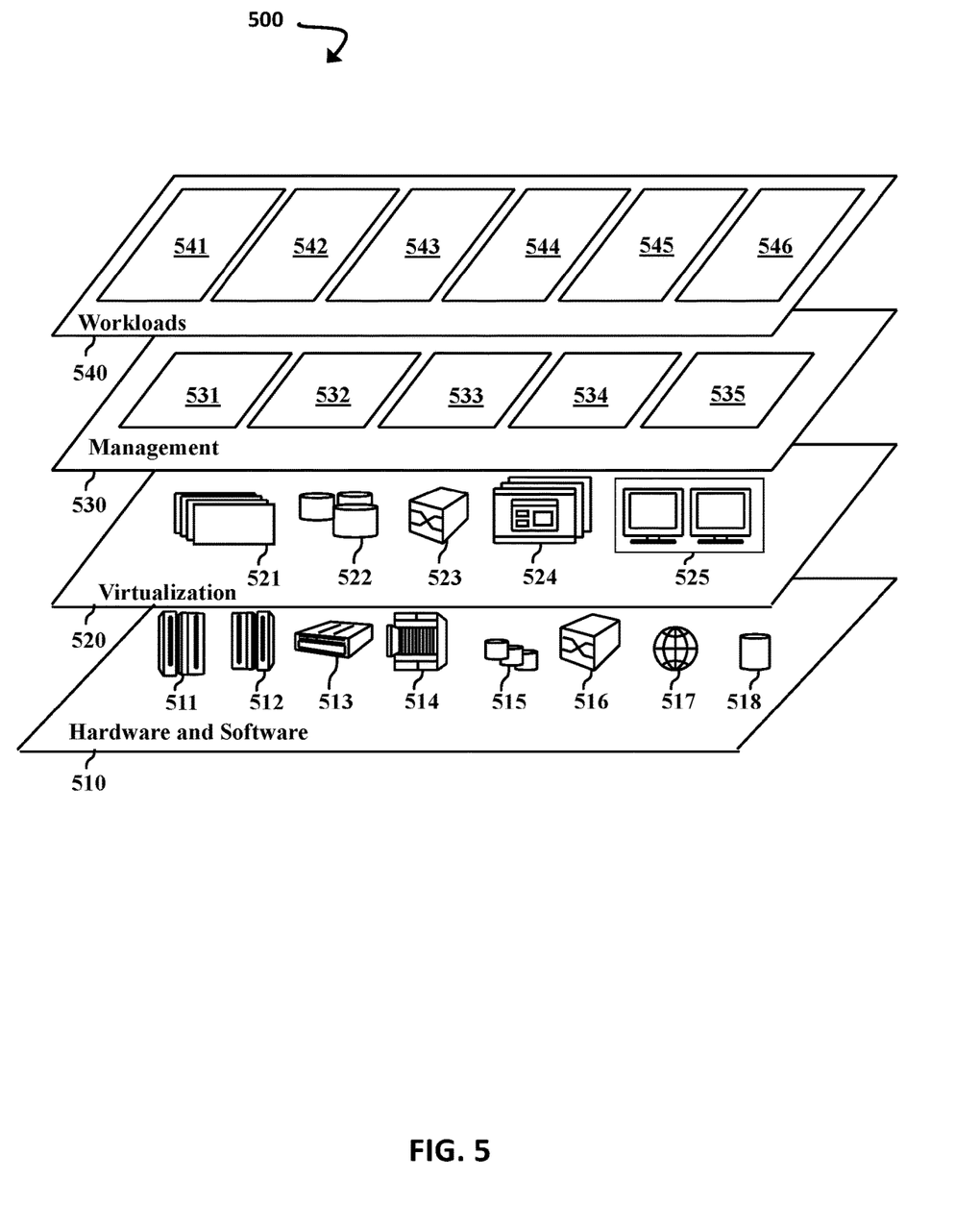
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and document classification 546.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2,or 100.1, 100.2), use of the reference character only without the letter or following numbers (e.g., 100) may refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, and item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A method, comprising:
receiving a set of documents;
selecting a topic;
determining that a first document from the set contains a topic label for the topic;
generating a topic sentiment score for the first document;
adding the topic sentiment score to a set of training data;
determining that a second document from the set does not contain the topic label;
generating an average sentiment score for the second document; and
generating a bias factor for the average sentiment score.

2. The method of claim 1, further comprising:
   determining that the bias factor is above a threshold bias factor; and
   in response to the determining that the bias factor is above the threshold bias factor, adding the average sentiment score to the set of training data.
3. The method of claim 2, further comprising training a model for the topic with the set of training data.
4. The method of claim 1, further comprising:
   determining that the bias factor is below a threshold bias factor; and
   in response to the determining that the bias factor is below the threshold bias factor, adding the average sentiment score to a set of validation data.
5. The method of claim 1, further comprising:
   determining that the bias factor is below a threshold bias factor; and
   in response to the determining that the bias factor is below the threshold bias factor, generating a suggested sentiment score based on the average sentiment score.
6. The method of claim 5, further comprising: based on whether user feedback has been received in response to the suggested sentiment score, adding the average sentiment score to the set of training data or a set of validation data.
7. The method of claim 1, further comprising:
   training a model for the topic with the set of training data; and
   refining the model for the topic with the set of validation data.
8. The method of claim 1, wherein:
   the average sentiment score comprises a quantity of positive sentiments in the second document and a quantity of negative sentiments in the second document; and
   the bias factor represents a magnitude of difference between the quantities.
9. A system, comprising:
   a memory; and
   a processor communicatively coupled to the memory, wherein the processor is configured to perform a method comprising:
   receiving a set of documents;
   selecting a topic;
   determining that a first document from the set contains a topic label for the topic;
   generating a topic sentiment score for the first document;
   adding the topic sentiment score to a set of training data;
   determining that a second document from the set does not contain the topic label;
   generating an average sentiment score for the second document; and
   generating a bias factor for the average sentiment score.
10. The system of claim 9, wherein the method further comprises:
    determining that the bias factor is above a threshold bias factor; and
    in response to the determining that the bias factor is above the threshold bias factor, adding the average sentiment score to the set of training data.
11. The system of claim 9, wherein the method further comprises:
    determining that the bias factor is below a threshold bias factor; and
    in response to the determining that the bias factor is below the threshold bias factor, adding the average sentiment score to a set of validation data.
12. The system of claim 9, wherein the method further comprises:
    determining that the bias factor is below a threshold bias factor; and
    in response to the determining that the bias factor is below the threshold bias factor, generating a suggested sentiment score based on the average sentiment score.
13. The system of claim 12, wherein the method further comprises: based on whether user feedback has been received in response to the suggested sentiment score, adding the average sentiment score to the set of training data or a set of validation data.
14. The system of claim 9, wherein the method further comprises:
    training a model for the topic with the set of training data; and
    refining the model for the topic with the set of validation data.
15. The system of claim 9, wherein:
    the average sentiment score comprises a quantity of positive sentiments in the second document and a quantity of negative sentiments in the second document; and
    the bias factor represents a magnitude of difference between the quantities.
16. A computer program product, the computer program product comprising a computer readable storage medium having program instructions embodied therewith, the program instructions executable by a processor to cause a device to perform a method, comprising:
    receiving a set of documents;
    selecting a topic;
    determining that a first document from the set contains a topic label for the topic;
    generating a topic sentiment score for the first document;
    adding the topic sentiment score to a set of training data;
    determining that a second document from the set does not contain the topic label;
    generating an average sentiment score for the second document; and
    generating a bias factor for the average sentiment score.
17. The computer program product of claim 16, wherein the method further comprises:
    determining that the bias factor is above a threshold bias factor; and
    in response to the determining that the bias factor is above the threshold bias factor, adding the average sentiment score to the set of training data.
18. The computer program product of claim 16, wherein the method further comprises:
    determining that the bias factor is below a threshold bias factor; and
    in response to the determining that the bias factor is below the threshold bias factor, adding the average sentiment score to a set of validation data.
19. The computer program product of claim 16, wherein the method further comprises:
    determining that the bias factor is below a threshold bias factor; and
    in response to the determining that the bias factor is below the threshold bias factor, generating a suggested sentiment score based on the average sentiment score.

20. The computer program product of claim 16, wherein:
the average sentiment score comprises a quantity of positive sentiments in the second document and a quantity of negative sentiments in the second document; and
the bias factor represents a magnitude of difference between the quantities.

* * * * *